No. 795,689. PATENTED JULY 25, 1905.
T. L. CARBONE.
DEVICE FOR INFLUENCING ELECTRIC ARCS.
APPLICATION FILED JAN. 31, 1905.

Witnesses
Wm. Kuehne
John A. Percival

Inventor
Tito Livio Carbone
by Richards
Att'ys

UNITED STATES PATENT OFFICE.

TITO LIVIO CARBONE, OF BERLIN, GERMANY.

DEVICE FOR INFLUENCING ELECTRIC ARCS.

No. 795,689.      Specification of Letters Patent.      Patented July 25, 1905.

Application filed January 31, 1905. Serial No. 243,548.

*To all whom it may concern:*

Be it known that I, TITO LIVIO CARBONE, engineer, a citizen of Switzerland, residing at Berlin, in the Kingdom of Prussia, German Empire, have invented new and useful Improvements in Devices for Influencing Electric Arcs, of which the following is a specification.

This invention has for its object a device applicable to electric-arc lamps having convergent downwardly-directed carbon electrodes.

The device consists of one or several iron rings carrying windings through which an electric current is so passed that opposite magnetic poles are formed near to the two carbon electrodes the magnetic action of which is in the same direction as that wherein the current flows through the electrodes. The wound iron rings can, for example, be arranged horizontally, and the two parts of the same at opposite sides of the plane of the electrodes can be so wound that two like poles are formed in proximity to the one electrode, while the corresponding poles of opposite polarity to the former are in proximity to the other carbon electrode, or two rings can be arranged symmetrically at opposite sides of the plane of the electrodes, and they may be so wound that beside each electrode two like poles are formed which are opposite in polarity to the poles beside the other electrode. This effect can be obtained by the use of two rings, one at each side of the plane of the electrodes, the said rings being bent back upon themselves and so wound that similar poles stand opposite to one another on opposite sides of the plane of the electrodes, while the two unlike poles on the same side of the plane of the electrodes have their magnetic circuits completed through the bent-back part of the ring which is not surrounded by a winding.

The invention is illustrated in several forms of construction in the accompanying drawings.

Figure 1:
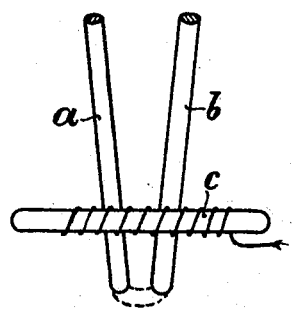
Figure 4:
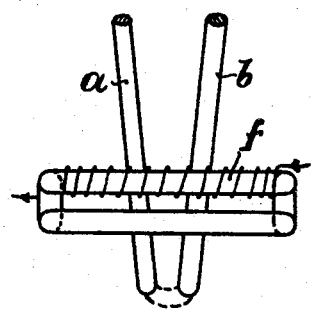
Figure 2:
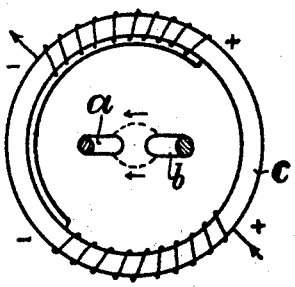
Figure 5:
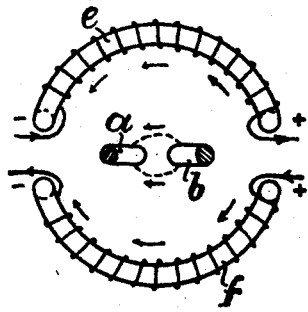
Figure 3:
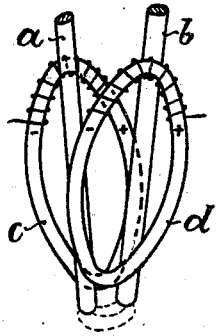
Figure 6:
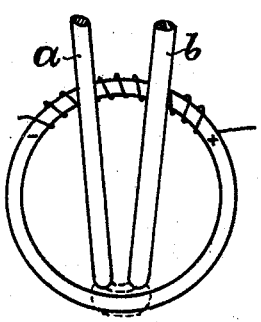

Figure 1 shows a device in which the wound iron ring is arranged horizontally. Fig. 2 is a plan of Fig. 1. Fig. 3 shows a device in which there are two iron rings arranged symmetrically at opposite sides of the plane of the electrodes. Figs. 4 and 5 show a form of construction in which rings bent back on themselves and provided with windings are arranged at opposite sides of the plane of the electrodes. Fig. 6 shows a form of construction in which a single ring is employed placed at the side of the arc.

According to Fig. 1 the iron ring $c$ is arranged horizontally at a little distance above the lower ends of the carbon electrodes $a$ and $b$. The parts of the iron ring $c$ on opposite sides of the plane passing through the electrodes are so wound that, for example, in the neighborhood of the positive electrode $b$ a north pole is formed and in the neighborhood of the negative electrode $a$ a south pole. In consequence of this the magnetic action is in the same direction as that in which the current flows through the carbon electrodes. By this means the arc is influenced in an especially favorable manner and a strong and steady light is the result.

According to Fig. 3 the two wound iron rings $c$ $d$ are so arranged at opposite sides of the carbon electrodes $a$ and $b$ that near the carbon electrode $a$ two like poles are produced, while near the electrode $b$ there are also two like poles; but these latter are opposite in polarity to the first pair of poles. The rings $c$ and $d$ are provided with windings through which the current is caused to pass in such a direction that beside the positive carbon two north poles are produced, while beside the negative carbon there are two south poles. In this way the magnetic action operates in the same direction as that in which the current flows from the positive carbon $b$ to the negative carbon $a$. With this arrangement, therefore, the electric arc is favorably affected and a strong steady light is produced.

According to Figs. 4 and 5 rings $e$ and $f$, bent back upon themselves, are arranged at opposite sides of the plane passing through the carbon electrodes $a$ and $b$. Each ring $e$ and $f$ is so bent upon itself and so wound, as is illustrated in the drawings, that like poles stand opposite to one another on opposite sides of the plane of the electrodes. In this arrangement the poles projecting from the ends of the windings on each ring have their magnetic circuits completed through the bent-back parts of the rings which carry no windings. With this arrangement also the arc is influenced in an especially favorable manner, and in consequence of this a strong steady light is produced. Instead of winding the upper parts of the rings which are bent back upon themselves the windings could also be arranged on the lower parts. Further, the rings might be made up of several parts together giving the form of the bent-back ring without in any way departing from the essence of the invention. The position, form, and arrangement of the rings will always be that most suitable in view of the actual circumstances under which the arc-lamp is to work. It is essential that the wound iron rings from poles of opposite polarity beside the two carbon electrodes and that the magnetic acton should be in the same direction as that in which the current flows through the carbon electrodes.

In the form of construction shown in Fig. 6 only one iron ring placed at the side of the plane of the electrodes is employed, said ring being so wound that there is a north pole at the postitive electrode and a south pole at the negative electrode, in which case the magnetic action is also in the same direction as that in which the current flows through the carbon electrodes.

Having now described my invention and in what manner the same is to be performed, what I claim, and desire to secure by Letters Patent, is—

1. A device for influencing the arc of electric-arc lamps having downwardly-directed converging carbon electrodes consisting in an iron ring with a winding, which is wound in such a manner, that magnetic poles of opposite polarity are produced at the two carbon electrodes and that the magnetic action is of the same direction as the current flows through the carbon electrodes, substantially as shown and described.

2. A device for influencing the arc of electric-arc lamps having downwardly-directed converging carbon electrodes consisting in two wound iron rings which are arranged symmetrically to the plane of the electrodes, said rings being wound in such a manner, that two like magnetic poles are produced at the one and two like poles of opposite polarity at the other electrode and that the magnetic action is of the same direction as the current flows through the carbon electrodes, substantially as shown and described.

3. A device for influencing the arc of electric-arc lamps having downwardly-directed converging carbon electrodes consisting in two wound iron rings, which are arranged symmetrically to the plane of the electrodes and bent back upon themselves, said iron rings being wound in such a manner, that two like magnetic poles are produced at the one and two like poles of opposite polarity at the other electrode and that the magnetic action is of the same direction as the current flows through the carbon electrodes, substantially as shown and described.

In testimony whereof I have signed my name to this specification in the presence of two subscribing witnesses.

TITO LIVIO CARBONE.

Witnesses:
 WOLDEMAR HAUPT,
 HENRY HASPER.